United States Patent
Wang

(10) Patent No.: US 9,144,086 B2
(45) Date of Patent: Sep. 22, 2015

(54) SYSTEMS AND METHODS FOR WIRELESS COEXISTENCE

(71) Applicant: QUALCOMM Incorporated, San Diego, CA (US)

(72) Inventor: Jibing Wang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 73 days.

(21) Appl. No.: 13/772,100

(22) Filed: Feb. 20, 2013

(65) Prior Publication Data

US 2014/0233444 A1 Aug. 21, 2014

(51) Int. Cl.
H04W 72/12 (2009.01)
H04W 52/02 (2009.01)
H04W 88/06 (2009.01)

(52) U.S. Cl.
CPC ........ *H04W 72/1242* (2013.01); *H04W 52/028* (2013.01); *H04W 52/02* (2013.01); *H04W 72/1215* (2013.01); *H04W 88/06* (2013.01); *Y02B 60/50* (2013.01)

(58) Field of Classification Search
USPC ........ 370/311, 246; 340/7.32–7.38; 455/41.2, 455/63.1, 78, 343.1–343.6, 501, 509
See application file for complete search history.

(56) References Cited

U.S. PATENT DOCUMENTS

| | | | |
|---|---|---|---|
| 7,768,981 B1 * | 8/2010 | Donovan et al. | 370/338 |
| 8,068,871 B2 | 11/2011 | Xhafa et al. | |
| 8,069,254 B2 | 11/2011 | Hlasny | |
| 2009/0180451 A1 | 7/2009 | Alpert et al. | |
| 2010/0316025 A1 | 12/2010 | Brandt et al. | |
| 2010/0329202 A1 | 12/2010 | Sun et al. | |
| 2011/0059768 A1 * | 3/2011 | Pandruvada | 455/552.1 |
| 2012/0020266 A1 | 1/2012 | Sun et al. | |
| 2012/0046000 A1 | 2/2012 | Gao et al. | |
| 2012/0106528 A1 | 5/2012 | Estevez et al. | |
| 2013/0040574 A1 * | 2/2013 | Hillyard | 455/41.2 |

OTHER PUBLICATIONS

ANT Message Protocol and Usage, D00000652, Rev 2.9, Dynastream Innovations Inc., Jul. 2, 2007.*
International Search Report and Written Opinion—PCT/US2014/015870—ISA/EPO—Jun. 3, 2014.
Texas Instruments., "1- and 8-Channel ANT RF Network Processors",, Mar. 31, 2011, XP002724265, pp. 1-42, Retrieved from the Internet: URL:http://www.ti.com/lit/ds/symlink/cc2571.pdf, [retrieved on May 13, 2014] the whole document.

* cited by examiner

*Primary Examiner* — Edan Orgad
*Assistant Examiner* — Saumit Shah
(74) *Attorney, Agent, or Firm* — Bay Area Technology Law Group PC

(57) ABSTRACT

Systems and methods are disclosed for coordinating operation of wireless local area network (WLAN) and ANT systems. A coexistence manager may determine an operating mode of the ANT transceiver and selectively enable and disable the ANT and WLAN transceivers based on the operating mode to reduce the potential for interference.

28 Claims, 5 Drawing Sheets

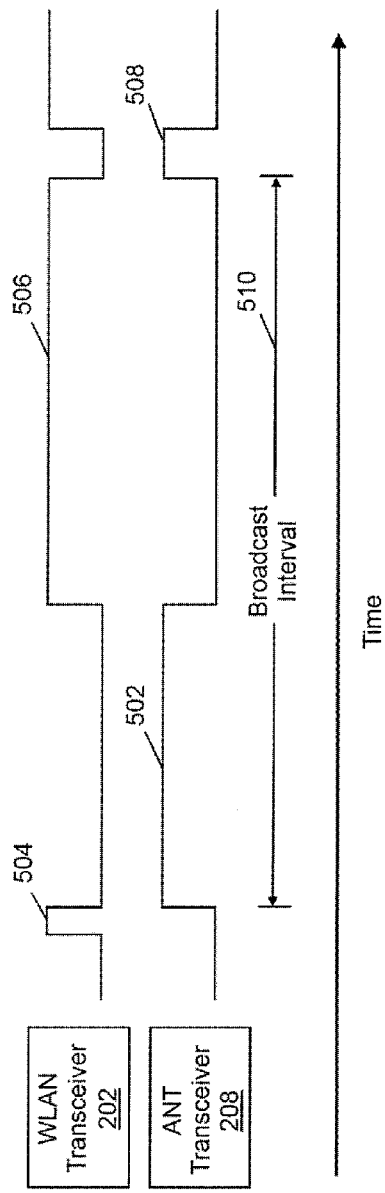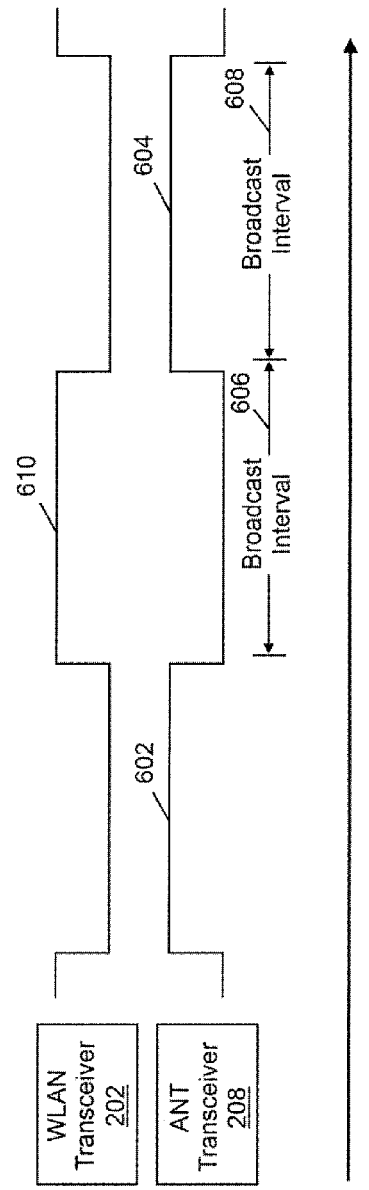

SYSTEMS AND METHODS FOR WIRELESS COEXISTENCE

FIELD OF THE PRESENT INVENTION

This disclosure generally relates to wireless communication systems and more specifically to systems and methods for managing coexistence between multiple wireless protocols.

BACKGROUND OF THE INVENTION

The recent proliferation of devices employing wireless technologies has led to the increasing availability of devices featuring multiple wireless communication systems. For example, a wireless local area network (WLAN) protocol, such as one conforming to the 802.11 family of standards promulgated by the Institute of Electrical and Electronics Engineers (IEEE), may offer relatively high data rates over relatively long distances, offering an easy interface to existing network infrastructures. However, WLAN systems are also associated with relatively high power consumption. As a result, it may be desirable to supplement a WLAN protocol with a more efficient system when a given application does not require the enhanced range and throughput provided by a WLAN system.

Accordingly, low power technologies, such as the ANT™ (ANT) protocol, have been developed for use in establishing personal area networks (PANs) among a plurality of connected devices and have become a popular means for short range communications. Devices employing these low power wireless protocols may consume substantially less power than those employing conventional WLAN systems, while still permitting low latency information exchange, at relatively lower rates and over a reduced range. As a result, these technologies enable an entire class of extremely low power, integrated devices that are capable of wireless communication. Devices employing these protocols may be able to operate for months or years using small, coin-cell batteries. Representative applications for low power wireless devices include sensors such as those for health and environmental monitors.

To leverage the different advantages, a wireless communications device may support a low power wireless protocol to enable communication with such sensors and other low power wireless devices as well as one or more additional wireless protocols that may offer increased range and throughput. Despite the advantages of providing the varied functionality associated with multiple wireless protocols, the potential for interference between systems may exist, particularly due to the collocation in a single device. For example, the physical proximity of the wireless transceivers used to support the protocols may result in the transmission of one radio generating interference that impairs reception in the other radio. As a result, when two or more wireless protocols share a common frequency band, such as the 2.4 GHz Industrial, Science and Medicine (ISM) band, performance degradation may occur when the systems attempt to use the medium simultaneously.

Accordingly, it would be desirable to provide systems and methods for coordinating operation of the multiple wireless protocols to enhance coexistence. This disclosure satisfies this and other needs.

SUMMARY OF THE INVENTION

This disclosure involves systems for wireless communication, and may include a wireless communication device with a first wireless protocol transceiver, a second wireless protocol transceiver, and a coexistence manager that may selectively enable and disable the first wireless protocol transceiver and the second wireless protocol transceiver based on an operating mode of the second wireless protocol transceiver, wherein the second wireless protocol may be a low power wireless protocol having broadcast, burst and scan operating modes.

In one aspect, the coexistence manager may award priority to the second wireless protocol transceiver if the second wireless protocol transceiver is operating in the broadcast operating mode.

In another aspect, the coexistence manager may award priority to the second wireless protocol transceiver for a first period of time if the second wireless protocol transceiver is operating in the burst operating mode and if the coexistence manager determines a duration of an extended broadcast timeslot corresponding to the burst operating mode is below a threshold, wherein the first period of time corresponds to the duration of the extended broadcast timeslot. Further, the coexistence manager may award priority to the first wireless protocol transceiver for a first period of time if the second wireless protocol transceiver is operating in the burst operating mode and if the coexistence manager determines a duration of an extended broadcast timeslot corresponding to the burst operating mode is above a threshold and award priority to the second wireless protocol transceiver for a second period of time, wherein the first period of time precedes the second period of time and the second period of time corresponds to the duration of the extended broadcast timeslot. Additionally, the first wireless protocol transceiver may enter a power save mode of operation during the first period of time.

In another aspect, the coexistence manager may award priority between the first wireless protocol transceiver and the second wireless protocol transceiver for alternating periods of time, wherein each period of time of the alternating periods of time having one of a first duration and a second duration, if the second wireless protocol transceiver is operating in the scan operating mode, such that the coexistence manager may award priority to the second wireless protocol transceiver for each period of time of the alternating periods of time having the first duration, wherein the first duration corresponds to a broadcast transmission interval.

In yet another aspect, the coexistence manager may award priority between the first wireless protocol transceiver and the second wireless protocol transceiver for alternating periods of time if the second wireless protocol transceiver is operating in the scan operating mode, such that the coexistence manager may also provide a phase shift in the alternating periods of time after a phase interval corresponding to a broadcast transmission interval.

This disclosure also includes methods for wireless communication. For example, a suitable method for wireless communication in a device having a first wireless protocol transceiver and a second wireless protocol transceiver may involve the steps of determining an operating mode of the second wireless protocol transceiver and awarding priority to the first wireless protocol transceiver and the second wireless protocol transceiver based on the operating mode of the second wireless protocol transceiver, wherein the second wireless protocol is a low power wireless protocol having broadcast, burst and scan operating modes. In one aspect, priority may be awarded to the second wireless protocol transceiver if the second wireless protocol transceiver is operating in the broadcast operating mode.

In another aspect, the duration of an extended broadcast timeslot if the second wireless protocol transceiver is operating in the burst operating mode may be determined and priority awarded to the second wireless protocol transceiver for a first period of time if the duration is below a threshold, wherein the first period of time corresponds to the duration of the extended broadcast timeslot. Additionally, priority may be awarded to the first wireless protocol transceiver for a first period of time if the duration is above a threshold and priority may be awarded to the second wireless protocol transceiver for a second period of time, wherein the first period of time precedes the second period of time and the second period of time corresponds to the duration of the extended broadcast timeslot. Further, the first wireless protocol transceiver may enter a power save mode during the first period of time.

In a further aspect, priority may be awarded between the first wireless protocol transceiver and the second wireless protocol transceiver for alternating periods of time, wherein each period of time of the alternating periods of time having one of a first duration and a second duration, if the second wireless protocol transceiver is operating in the scan operating mode, such that priority is awarded to the second wireless protocol transceiver for each period of the alternating periods of time having the first duration, the first duration corresponds to a broadcast transmission interval.

Still further, priority may be awarded between the first wireless protocol transceiver and the second wireless protocol transceiver for alternating periods of time if the second wireless protocol transceiver is operating in the scan operating mode, and providing a phase shift in the alternating periods of time after a phase interval corresponding to a broadcast transmission interval.

This disclosure also includes a non-transitory processor-readable storage medium for operating a wireless communications device having a first wireless protocol transceiver and a second wireless protocol transceiver, the processor-readable storage medium having instructions including code for determining an operating mode of the second wireless protocol transceiver and code for awarding priority to the first wireless protocol transceiver and the second wireless protocol transceiver based on the operating mode of the second wireless protocol transceiver, wherein the second wireless protocol is a low power wireless protocol having broadcast, burst and scan operating modes. The storage medium may include code for awarding priority to the second wireless protocol transceiver if the second wireless protocol transceiver is operating in the broadcast operating mode.

In one aspect, the storage medium may include code for determining a duration of an extended broadcast timeslot if the second wireless protocol transceiver is operating in the burst operating mode and code for awarding priority to the second wireless protocol transceiver for a first period of time if the duration is below a threshold, wherein the first period of time corresponds to the duration of the extended broadcast timeslot. Further, it may also include code for determining a duration of an extended broadcast timeslot if the second wireless protocol transceiver is operating in the burst operating mode, code for awarding priority to the first wireless protocol transceiver for a first period of time if the duration is above a threshold, and code for awarding priority to the second wireless protocol transceiver for a second period of time, wherein the first period of time precedes the second period of time and the second period of time corresponds to the duration of the extended broadcast timeslot. Further, there may also be code for entering a power save mode of operation with the first wireless protocol transceiver during the first period of time.

In another aspect, the storage medium may have code for awarding priority between the first wireless protocol transceiver and the second wireless protocol transceiver for alternating periods of time having a first duration and a second duration if the second wireless protocol transceiver is operating in the scan operating mode, such that priority is awarded to the second wireless protocol transceiver during the alternating periods of time having the first duration and the first duration corresponds to a broadcast transmission interval. In yet another aspect, the storage medium may include code for awarding priority between the first wireless protocol transceiver and the second wireless protocol transceiver for alternating periods of time if the second wireless protocol transceiver is operating in the scan operating mode, and providing a phase shift in the alternating periods of time after a phase interval corresponding to a broadcast transmission interval.

This disclosure may also include a wireless communication device with a first wireless protocol transceiver, a second wireless protocol transceiver, and a means for awarding priority that may selectively enable and disable the first wireless protocol transceiver and the second wireless protocol transceiver based on an operating mode of the second wireless protocol transceiver, wherein the second wireless protocol may be a low power wireless protocol having broadcast, burst and scan operating modes.

In one aspect, the means for awarding priority may award priority to the second wireless protocol transceiver if the second wireless protocol transceiver is operating in the broadcast operating mode.

In another aspect, the means for awarding priority may award priority to the second wireless protocol transceiver for a first period of time if the second wireless protocol transceiver is operating in the burst operating mode and if the means for awarding priority determines a duration of an extended broadcast timeslot corresponding to the burst operating mode is below a threshold, wherein the first period of time corresponds to the duration of the extended broadcast timeslot. Further, the means for awarding priority may award priority to the first wireless protocol transceiver for a first period of time if the second wireless protocol transceiver is operating in the burst operating mode and if the means for awarding priority determines a duration of an extended broadcast timeslot corresponding to the burst operating mode is above a threshold and award priority to the second wireless protocol transceiver for a second period of time, wherein the first period of time precedes the second period of time and the second period of time corresponds to the duration of the extended broadcast timeslot. Additionally, the first wireless protocol transceiver may enter a power save mode of operation during the first period of time.

In another aspect, the means for awarding priority may award priority between the first wireless protocol transceiver and the second wireless protocol transceiver for alternating periods of time, wherein each period of time of the alternating periods of time having one of a first duration and a second duration, if the second wireless protocol transceiver is operating in the scan operating mode, such that the means for awarding priority may award priority to the second wireless protocol transceiver for each period of time of the alternating periods of time having the first duration, wherein the first duration corresponds to a broadcast transmission interval.

In yet another aspect, the means for awarding priority may award priority between the first wireless protocol transceiver and the second wireless protocol transceiver for alternating periods of time if the second wireless protocol transceiver is operating in the scan operating mode, such that the means for awarding priority may also provide a phase shift in the alternating periods of time after a phase interval corresponding to a broadcast transmission interval.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 5 depicts the enabled and disabled states of a WLAN transceiver and an ANT transceiver when operating in burst operating mode having an extended broadcast timeslot above a threshold, according to one embodiment of the invention;

FIG. 6 depicts the enabled and disabled states of a WLAN transceiver and an ANT transceiver when operating in scan operating mode, according to one embodiment of the invention;

DETAILED DESCRIPTION OF THE INVENTION

Figure 1:
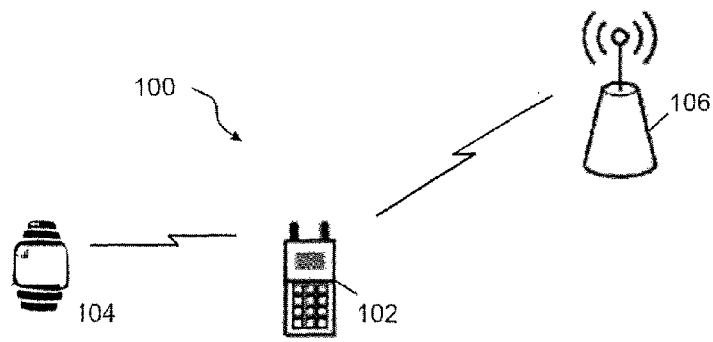
FIG. 1 schematically depicts a wireless environment including a wireless communications device having WLAN and ANT wireless protocols, according to one embodiment of the invention.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the invention in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

This disclosure includes techniques for providing coexistence between a low power wireless protocol and one or more additional wireless protocols. In one aspect, a suitable low power wireless protocol may be the ANT protocol, developed by and available from Dynastream Innovations, Inc. (Cochrane, Calif.). The ANT protocol operates over the 2.4 GHz ISM band and provides standards for data transmission, signaling, authentication and error detection. The ANT protocol is designed to provide highly efficient wireless transmission over relatively short distances. An ANT communications link may be established between at least two devices, and a wide variety of network topologies are possible, including point-to-point, star, tree or mesh. Depending upon the application, one device may perform in the role of a master and one or more associated devices may operate in the role of slave, or the devices may be organized in a peer-to-peer relationship.

The ANT protocol may be characterized by a number of operating modes, depending upon whether an ANT device is transmitting or receiving. At least two operating modes may be associated with transmission and at least one operating mode may be associated with reception.

With regard to transmission, a first operating mode may be a broadcast operating mode, in which an ANT device transmits using periodic timeslots at a defined frequency, such as approximately 250 ms. The transmit time may be relatively short, e.g., less than 1-2 ms, and may be followed by a relatively short reception period, e.g., approximately 600 µs. As a result, the broadcast operating mode may represent a relatively low duty cycle, e.g., less than approximately 3 ms every 250 ms. A second operating mode may be a burst operating mode, which may be used to provide increased data transfer rates and may be used to upload stored data from a sensor, for example. During burst operating mode, an ANT device may extend a broadcast transmission beyond the default duration of the timeslot. Accordingly, a transmission in burst operating mode may extend beyond 1 to 2 ms, e.g., 10 to 20 ms or longer.

With regard to reception, a third operating mode may be a scan operating mode, in which an ANT device may sequentially scan the available wireless channels to search for broadcast transmissions of a corresponding ANT device. The ANT protocol does not employ a master clock, so an ANT device in scan operating mode may not have timing information regarding the timing of broadcast transmissions. As a result, the ANT device may scan the wireless channels until a broadcast transmission is successfully received to synchronize timing with the transmitting ANT device.

By employing the techniques of this disclosure, a wireless communications device may offer compatibility with low power wireless devices by employing a low power wireless protocol while also providing the capabilities of one or more additional wireless protocols, such as the increased range and throughput of a WLAN protocol. To reduce the potential of interference between the wireless protocols, a coexistence manager may be employed to arbitrate access to the wireless media based upon the operating mode of the low power wireless protocol.

To help illustrate the systems and methods of this disclosure, an exemplary wireless communication system 100 is shown in FIG. 1, including wireless communications device 102 having WLAN and ANT capabilities. In this embodiment, wireless communications device 102 may form an ANT communications link with low power device 104, such as a heart rate sensor wristwatch. Low power device 104 may be any suitably configured health or environment sensor or any device that may utilize the power efficient wireless communication capabilities represented by the low power wireless protocol. Wireless communications device 102 may also form a WLAN communications link with access point 106 in an infrastructure WLAN. In other embodiments, wireless communications device 102 may form a connection with any other type of wireless communications device in any suitable network topology, including an ad hoc network or peer to peer protocol, such as Wi-Fi Direct™. Although embodiments of this disclosure are described with reference to ANT and WLAN wireless protocols, these techniques may be extended to a wireless communications device employing any other wireless protocol, such as code division multiple access (CDMA) networks, high speed packet access (HSPA(+)), high-speed downlink packet access (HSDPA), global system for mobile communications (GSM), enhanced data GSM environment (EDGE), long term evolution (LTE), WiMax®, BLUETOOTH® (Bluetooth), ZigBee®, wireless universal serial bus (USB), and the like, having the equivalent characteristics.

Figure 2:
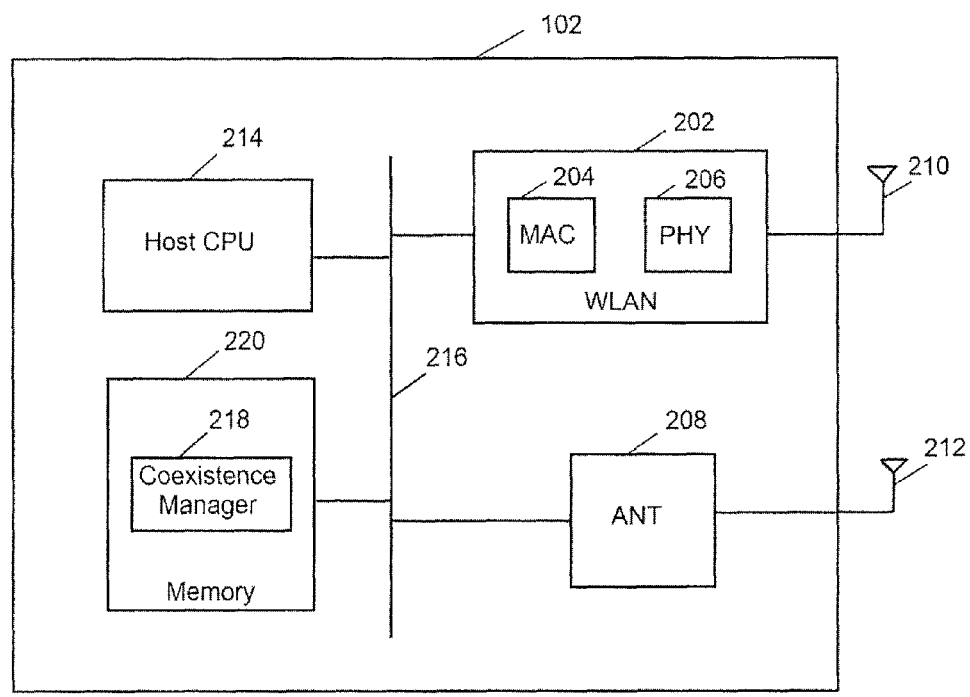
FIG. 2 schematically depicts functional blocks of a wireless communications device that arbitrates between ANT and WLAN wireless protocols based on an operating mode of the ANT transceiver, according to one embodiment of the invention.

Additional details regarding one embodiment of wireless communications device 102 are depicted as high level schematic blocks in FIG. 2. In some embodiments, wireless communications device 102 may employ an architecture in which the lower levels of the WLAN protocol stack are implemented in firmware and hardware of WLAN transceiver 202. As shown, WLAN transceiver 202 includes media access controller (MAC) 204 that performs functions related to the handling and processing of IEEE 802.11 family of standards defined (802.11) frames of data including verification, acknowledgment, routing, formatting and the like. Incoming and outgoing frames are exchanged between MAC 204 and physical layer (PHY) 206, which as shown here includes the functions of modulating the frames according to the relevant 802.11 protocol as well as providing the analog processing and RF conversion necessary to provide transmission and reception of wireless signals. WLAN transceiver 202 may also include ANT transceiver 208 having firmware and hardware for implementing network and transport functions as well as the data link layer and physical layer. The ANT protocol is designed to require low host computing resources. In the depicted embodiment, WLAN transceiver 202 and ANT transceiver 208 each have an associated antenna, antennas 210 and 212, respectively. ANT antenna 212 may be integrated into a single package with ANT transceiver 208. However, as desired and depending upon the wireless protocols employed, one or more antennas may be shared between the transceivers using switching techniques known in the art. Likewise, some or all elements of the respective transceivers may be colocated on a common system, e.g., on the same circuit board or on distinct circuit boards within the same system, or may be embedded on the same integrated circuit as in a system on a chip (SoC) implementation.

Wireless communications device 102 also includes host CPU 214 configured to perform the various computations and operations involved with the functioning of wireless communications device 102. Host CPU 214 is coupled to WLAN transceiver 202 and ANT transceiver 208 through bus 216, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. The ANT protocol may allow the use of a bidirectional, serial message protocol so that information may be exchanged between host CPU 214 and low power device 104 over the physical channel formed with ANT transceiver 208.

As shown, wireless communications device 102 may include coexistence manager 218 implemented as processor-readable instructions stored in memory 220 that may be executed by CPU 214 to coordinate operation of WLAN transceiver 202 and ANT transceiver 208 according to the techniques of this disclosure. According to aspects described below, coexistence manager 218 may be configured to determine an operating mode associated with ANT transceiver 208 and provide a time division-based arbitration between WLAN transceiver 202 and ANT transceiver 208.

In one embodiment, coexistence manager 218 may be configured to determine ANT transceiver 208 is in an operating mode associated with the broadcast operating mode. As described above, during broadcast operating mode, ANT transceiver 208 may transmit information during periodic timeslots occurring at a defined frequency, e.g., approximately 250 ms. The transmit time may be relatively short, e.g., less than 1-2 ms, and may followed by a relatively short reception period, e.g., approximately 600 µs. As a result, the broadcast operating mode may represent a relatively low duty cycle, e.g., less than approximately 3 ms every 250 ms. Coexistence manager 218 may be configured to grant priority to ANT transceiver 208 for the duration of each broadcast timeslot and to WLAN transceiver 202 for the remainder of the time. Coexistence manager may give priority to ANT transceiver 208 for such broadcast timeslots without substantially degrading performance of WLAN transceiver due to the low duty cycle associated with the broadcast operating mode.

Figure 3:
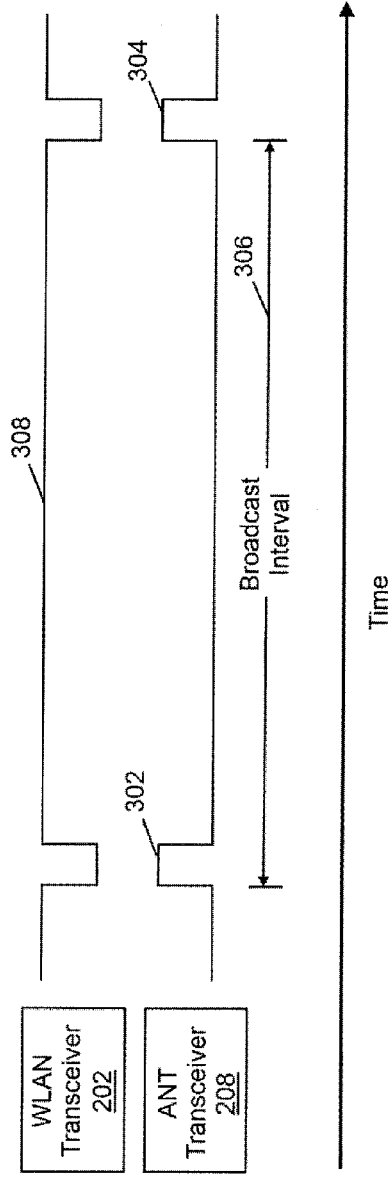
FIG. 3 depicts the enabled and disabled states of a WLAN transceiver and an ANT transceiver when operating in broadcast operating mode, according to one embodiment of the invention.

A schematic representation of the coexistence between WLAN transceiver 202 and ANT transceiver 208 in broadcast operating mode is depicted in FIG. 3. As shown, ANT transceiver 208 may be enabled and WLAN transceiver 202 may be disabled for periods of time corresponding to broadcast timeslots 302 and 304, which occur periodically at broadcast interval 306. During periods of time between the broadcast timeslots, such as period 308, WLAN transceiver 202 may be enabled and ANT transceiver 208 disabled. Coexistence manager 218 may determine the appropriate broadcast interval and timeslot duration from ANT transceiver 208.

In another embodiment, coexistence manager 218 may be configured to determine ANT transceiver 208 is in an operating mode associated with the burst operating mode. During burst operating mode, ANT transceiver 208 may extend a broadcast transmission beyond the default duration of the timeslot. Accordingly, a transmission in burst operating mode may extend beyond 1 to 2 ms and last for longer duration, e.g., 10 to 20 ms or longer. Coexistence manager 218 may be configured to determine a duration associated with the extended broadcast time slot and grant priority to ANT transceiver 208 for the duration of the extended broadcast timeslot when the duration is below a given threshold. The threshold may be established based on the relative level of performance desired between the WLAN and ANT systems (e.g., heuristically determined through past performance or simulations, or determined through a best guess method, or predefined for specific situations). For example, a threshold of 10 to 20 ms may be employed while maintaining WLAN performance at an increased level and increasing a threshold may be employed when increased performance of the ANT system is desired.

Figure 4:
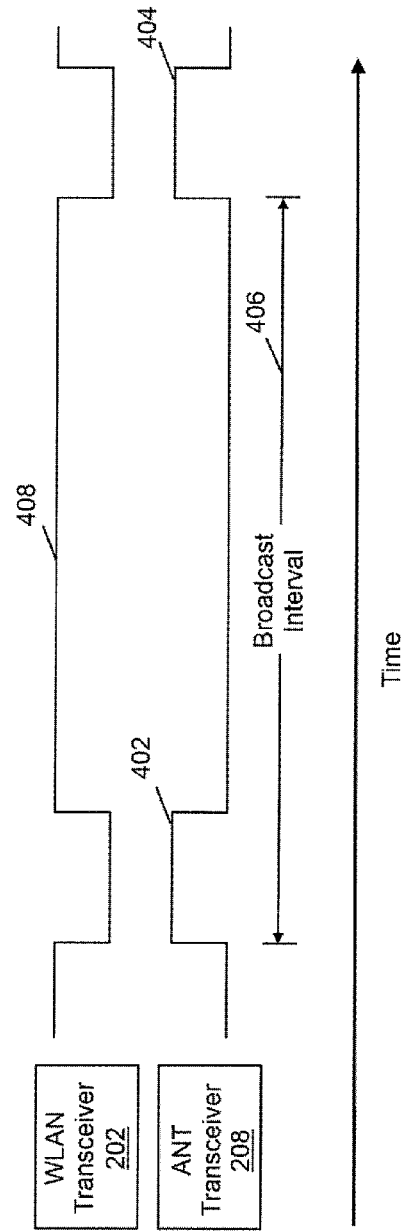
FIG. 4 depicts the enabled and disabled states of a WLAN transceiver and an ANT transceiver when operating in burst operating mode having an extended broadcast timeslot below a threshold, according to one embodiment of the invention.

A schematic representation of the coexistence between WLAN transceiver 202 and ANT transceiver 208 in burst operating mode with an extended broadcast timeslot below the threshold is depicted in FIG. 4. As shown, ANT transceiver 208 may be enabled and WLAN transceiver 202 may be disabled for periods of time corresponding to the extended broadcast timeslots 402 and 404, that occur periodically at broadcast interval 406. During periods of time between the extended broadcast timeslots, such as period 408, WLAN transceiver 202 may be enabled and ANT transceiver 208 disabled. Coexistence manager 218 may determine the extended broadcast timeslot duration from ANT transceiver 208.

When coexistence manager 218 determines that the extended broadcast timeslot has a duration exceeding the threshold, WLAN transceiver 202 may be granted temporary access to invoke a power save mode and gracefully suspend operations. For example, WLAN transceiver 202 may send a management frame having a power management bit set so that access point 106 will buffer data to be transmitted to wireless communications device 102. Coexistence manager 218 may then grant access to ANT transceiver 208 for a period of time corresponding to the extended broadcast timeslot duration. When WLAN transceiver 202 is granted access again, WLAN transceiver 202 may poll access point 106 for the buffered data.

A schematic representation of the coexistence between WLAN transceiver 202 and ANT transceiver 208 in burst operating mode with an extended broadcast timeslot above the threshold is depicted in FIG. 5. Upon determining the existence of an upcoming extended broadcast timeslot 502, coexistence manager 218 may enable WLAN transceiver 202 for period 504 to communicate entry to a power save mode. Next, ANT transceiver 208 may be enabled and WLAN transceiver 202 may be disabled for the period of time corresponding to the extended broadcast timeslots 502. Following the extended broadcast timeslot 502, coexistence manager 218 may enable WLAN transceiver 202 and disable ANT transceiver 208 for a period 506 corresponding to the remaining duration of broadcast interval 508. Operation of coexistence manager 218 continue as described above for a subsequent default broadcast timeslot 510, or the routine may be repeated if coexistence manager 218 determines existence of another extended broadcast timeslot.

In yet another embodiment, coexistence manager 218 may be configured to determine ANT transceiver 208 is in an operating mode associated with the scan operating mode. As described above, ANT transceiver 208 may not have timing information regarding transmission of a broadcast of another ANT device, such as low power device 104. Accordingly, ANT transceiver 208 may scan all the channels for a period of time sufficient to overlap the broadcast transmission of low power device 104 to receive the transmission and synchronize to form the ANT link. When coexistence manager 218 determines the WLAN system does not need increased priority, the respective systems may be enabled for alternating periods of time, such that a first duration of time corresponding to the frequency of broadcast transmissions may be allocated to ANT transceiver 208. For example, given a broadcast interval of 250 ms as discussed above, coexistence manager 218 may allocate a period of time with a first duration configured to overlap this period, such as approximately 260 ms. Similarly, coexistence manager 218 may allocate a second duration of time to WLAN transceiver 202. The duration of the second period of time may be tailored to provide the desired balance of performance. In one aspect, relatively even weight may be given to WLAN transceiver 206 by allocating a similar duration, such as 250 ms. However, as desired, greater or less time may be allocated to the WLAN system to obtain a corresponding level of performance.

A schematic representation of the coexistence between WLAN transceiver 202 and ANT transceiver 208 in scan operating mode with relatively equal priority being awarded to the ANT and WLAN systems is depicted in FIG. 6. As shown, coexistence manager 218 may enable ANT transceiver 208 and disable WLAN transceiver 202 for periods of time 602 and 604 having a first duration corresponding to the broadcast interval 606 and 608. During alternating periods of time having a second duration, such as period 610, WLAN transceiver 202 may be enabled and ANT transceiver 208 may be disabled. Accordingly, if the timing of the broadcast transmission occurs relatively early in the window allocated to WLAN transceiver 202, such as shown with regard to broadcast interval 606, a second duration equal to the broadcast interval or less helps ensure that a subsequent broadcast transmission occurs during the window allocated to ANT transceiver 208, such as period 604. Further, the use of a first duration marginally longer than the broadcast interval helps ensure that at least one broadcast transmission in any adjacent pair will fall within the window allocated to ANT transceiver 208, as indicated by broadcast interval 608.

When coexistence manager 218 determines it may be desirable to accord the WLAN system increased priority, alternating periods of shorter duration may be employed. The WLAN system may be granted increased priority to improve quality of service (QoS) during latency sensitive communications, such as multimedia streaming, or as otherwise warranted. Under these conditions, it may not be desirable to suspend WLAN operation for the entire time associated with the ANT broadcast interval. Coexistence manager 218 may provide shorter alternating periods of time between the ANT and WLAN systems, e.g., 25 ms. Any suitable duration may be employed, such that shorter durations may improve WLAN performance and longer durations may decrease the time required to achieve an overlap with an ANT broadcast transmission. To decrease the possibility of missing multiple ANT broadcast transmissions, coexistence manager 218 may be configured to shift the phase of the time division allocation between the ANT and WLAN systems at a suitable time, such as at periods corresponding to the broadcast interval. By shifting the phase, if a first broadcast transmission occurs during a period of time allocated to the WLAN system, the next broadcast transmission may occur during a period of time allocated to the ANT system.

Figure 7:
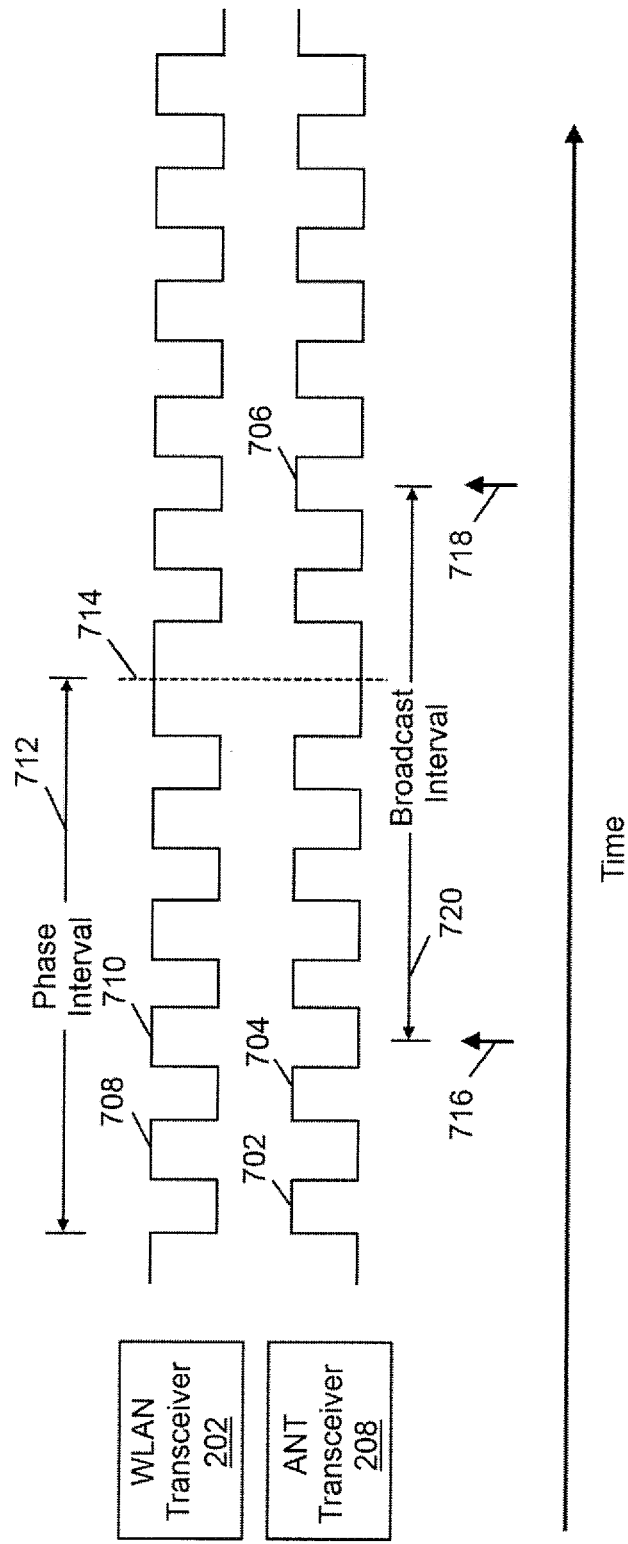
FIG. 7 depicts the enabled and disabled states of a WLAN transceiver and an ANT transceiver when operating in scan operating mode with increased priority for the WLAN transceiver, according to one embodiment of the invention.

A schematic representation of the coexistence between WLAN transceiver 202 and ANT transceiver 208 in scan operating mode with increased priority awarded to the WLAN system is depicted in FIG. 7. As shown, coexistence manager 218 may enable ANT transceiver 208 and disable WLAN transceiver 202 for alternating periods of time, such as periods 702, 704 and 706. Likewise, coexistence manager 218 may enable WLAN transceiver 202 and disable ANT transceiver 208 for complementary periods of time, such as periods 708 and 710. The periods of time may have a suitable duration, e.g., 25 ms, to provide a reasonable likelihood of receiving an entire ANT broadcast transmission. The duration may also be adjusted to vary the balance of performance between the WLAN and ANT systems as described above. Further, the phase of enabling and disabling cycle may be shifted after a phase interval 712, such as at phase shift 714. As desired, the duration of the phase interval may be approximately the same as the broadcast interval. Accordingly, even if first broadcast transmission 716 occurs during period 710 when WLAN transceiver 202 is enabled and ANT transceiver 208 is disabled, the subsequent second broadcast transmission 718 may occur after broadcast interval 720. Due to phase shift 714, second broadcast transmission 718 occurs during period 706 when coexistence manager 218 has enabled ANT transceiver 208 and disabled WLAN transceiver 202, allowing second broadcast transmission 718 to be received by the ANT system.

Figure 8:
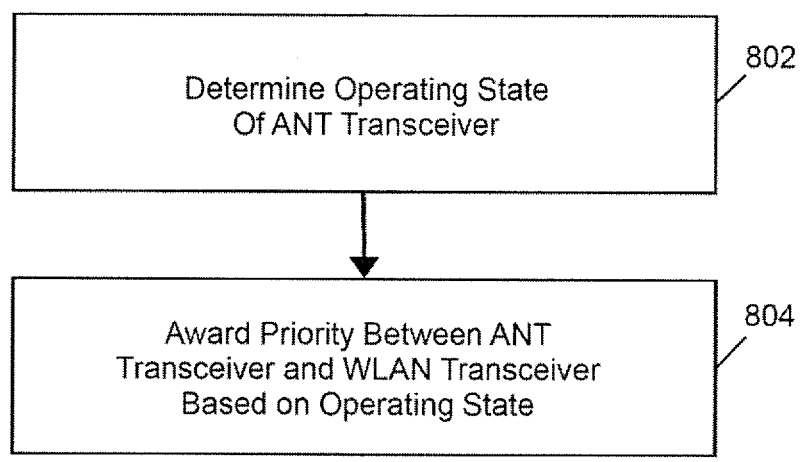
FIG. 8 is a flowchart showing an exemplary routine for operating an AMP link based on the information the operational status of a WLAN transceiver of the device, according to one embodiment of the invention.

One suitable example of the techniques of this disclosure for employing coexistence manager 218 to selectively enable and disable WLAN transceiver 202 and ANT transceiver 208 based on an operating mode of the ANT system is represented by the flowchart of FIG. 8. Beginning with step 802, coexistence manager 218 may determine information regarding the operating mode of ANT transceiver 208. Correspondingly, in step 804 coexistence manager may enable and disable WLAN transceiver 202 and ANT transceiver 208 based on the operating mode.

Described herein are presently preferred embodiments. However, one skilled in the art that pertains to the present invention will understand that the principles of this disclosure can be extended easily with appropriate modifications to other applications.

What is claimed is:

1. A wireless communication device comprising:
   a first wireless protocol transceiver to use a first wireless protocol;
   a second wireless protocol transceiver to use a second wireless protocol; and
   a coexistence manager to selectively award priority for being enabled between the first wireless protocol transceiver and the second wireless protocol transceiver based at least in part on an operating mode of the second wireless protocol transceiver,
   wherein the second wireless protocol is a low power wireless protocol including a broadcast operating mode comprising a periodic time slot for transmission, a burst operating mode comprising an extended broadcast time slot, and a scan operating mode and wherein relatively greater priority is awarded to the broadcast operating mode relative to the burst operating mode and relatively greater priority is awarded to the broadcast operating mode relative to the scan operating mode.

2. The wireless communications device of claim 1, wherein the coexistence manager to award priority to the second wireless protocol transceiver if the second wireless protocol transceiver is operating in the broadcast operating mode.

3. The wireless communications device of claim 1, wherein the coexistence manager to award priority to the second wireless protocol transceiver for a first period of time if:
   the second wireless protocol transceiver is operating in the burst operating mode, and
   the coexistence manager determines a duration of an extended broadcast timeslot corresponding to the burst operating mode is below a threshold, wherein the first period of time corresponds to the duration of the extended broadcast timeslot.

4. The wireless communications device of claim 1, wherein the coexistence manager to:
   award priority to the first wireless protocol transceiver for a first period of time if:
   the second wireless protocol transceiver is operating in the burst operating mode, and
   the coexistence manager determines a duration of an extended broadcast timeslot corresponding to the burst operating mode is above a threshold; and
   award priority to the second wireless protocol transceiver for a second period of time, wherein the first period of time precedes the second period of time and the second period of time corresponds to the duration of the extended broadcast timeslot.

5. The wireless communications device of claim 4, wherein the first wireless protocol transceiver to enter a power save mode of operation during the first period of time.

6. The wireless communications device of claim 1, wherein the coexistence manager is configured to award priority between the first wireless protocol transceiver and the second wireless protocol transceiver for alternating periods of time, wherein each period of time of the alternating periods of time having one of a first duration and a second duration, if the second wireless protocol transceiver is operating in the scan operating mode, such that the coexistence manager awards priority to the second wireless protocol transceiver for each period of time of the alternating periods of time having the first duration, wherein the first duration corresponds to a broadcast transmission interval.

7. The wireless communications device of claim 1, wherein the coexistence manager to award priority between the first wireless protocol transceiver and the second wireless protocol transceiver for alternating periods of time when the second wireless protocol transceiver is operating in the scan operating mode, such that the coexistence manager further to provide a phase shift in the alternating periods of time after a phase interval corresponding to a broadcast transmission interval.

8. A method for wireless communication in a device including a first wireless protocol transceiver to use a first wireless protocol and a second wireless protocol transceiver to use a second wireless protocol, comprising:
determining an operating mode of the second wireless protocol transceiver; and
awarding priority for being enabled between the first wireless protocol transceiver and the second wireless protocol transceiver based at least in part on the operating mode of the second wireless protocol transceiver,
wherein the second wireless protocol is a low power wireless protocol including a broadcast operating mode comprising a periodic time slot for transmission, a burst operating mode comprising an extended broadcast time slot, and a scan operating mode and wherein relatively greater priority is awarded to the broadcast operating mode relative to the burst operating mode and relatively greater priority is awarded to the broadcast operating mode relative to the scan operating mode.

9. The method of claim 8, further comprising awarding priority to the second wireless protocol transceiver if the second wireless protocol transceiver is operating in the broadcast operating mode.

10. The method of claim 8, further comprising determining a duration of an extended broadcast timeslot if the second wireless protocol transceiver is operating in the burst operating mode and awarding priority to the second wireless protocol transceiver for a first period of time if the duration is below a threshold, wherein the first period of time corresponds to the duration of the extended broadcast timeslot.

11. The method of claim 8, further comprising:
determining a duration of an extended broadcast timeslot when the second wireless protocol transceiver is operating in the burst operating mode;
awarding priority to the first wireless protocol transceiver for a first period of time if the duration is above a threshold; and
awarding priority to the second wireless protocol transceiver for a second period of time, wherein the first period of time precedes the second period of time and the second period of time corresponds to the duration of the extended broadcast timeslot.

12. The method of claim 11, further comprising entering a power save mode of operation with the first wireless protocol transceiver during the first period of time.

13. The method of claim 8, further comprising awarding priority between the first wireless protocol transceiver and the second wireless protocol transceiver for alternating periods of time, wherein each period of time of the alternating periods of time having one of a first duration and a second duration, if the second wireless protocol transceiver is operating in the scan operating mode, such that priority is awarded to the second wireless protocol transceiver for each period of time of the alternating periods of time having the first duration, wherein the first duration corresponds to a broadcast transmission interval.

14. The method of claim 8, further comprising awarding priority between the first wireless protocol transceiver and the second wireless protocol transceiver for alternating periods of time when the second wireless protocol transceiver is operating in the scan operating mode, and providing a phase shift in the alternating periods of time after a phase interval corresponding to a broadcast transmission interval.

15. A non-transitory processor-readable storage medium for operating a wireless communications device having a first wireless protocol transceiver to use a first wireless protocol and a second wireless protocol transceiver to use a second wireless protocol, the processor-readable storage medium having instructions thereon, the instructions comprising:
code for determining an operating mode of the second wireless protocol transceiver; and
code for awarding priority for being enabled between the first wireless protocol transceiver and the second wireless protocol transceiver based on the operating mode of the second wireless protocol transceiver,
wherein the second wireless protocol is a low power wireless protocol including a broadcast operating mode comprising a periodic time slot for transmission, a burst operating mode comprising an extended broadcast time slot, and a scan operating mode and wherein relatively greater priority is awarded to the broadcast operating mode relative to the burst operating mode and relatively greater priority is awarded to the broadcast operating mode relative to the scan operating mode.

16. The storage medium of claim 15, further comprising code for awarding priority to the second wireless protocol transceiver if the second wireless protocol transceiver is operating in the broadcast operating mode.

17. The storage medium of claim 15, further comprising:
code for determining a duration of an extended broadcast timeslot if the second wireless protocol transceiver is operating in the burst operating mode; and
code for awarding priority to the second wireless protocol transceiver for a first period of time if the duration is below a threshold, wherein the first period of time corresponds to the duration of the extended broadcast timeslot.

18. The storage medium of claim 15, further comprising:
code for determining a duration of an extended broadcast timeslot when the second wireless protocol transceiver is operating in the burst operating mode;
code for awarding priority to the first wireless protocol transceiver for a first period of time if the duration is above a threshold; and
code for awarding priority to the second wireless protocol transceiver for a second period of time, wherein the first period of time precedes the second period of time and the second period of time corresponds to the duration of the extended broadcast timeslot.

19. The storage medium of claim 18, further comprising code for entering a power save mode of operation with the first wireless protocol transceiver during the first period of time.

20. The storage medium of claim 15, further comprising code for awarding priority between the first wireless protocol transceiver and the second wireless protocol transceiver for alternating periods of time, wherein each period of time of the alternating periods of time having one of a first duration and a second duration, if the second wireless protocol transceiver is operating in the scan operating mode, such that priority is awarded to the second wireless protocol transceiver for each period of the alternating periods of time having the first duration, wherein the first duration corresponds to a broadcast transmission interval.

21. The storage medium of claim 15, further comprising code for awarding priority between the first wireless protocol transceiver and the second wireless protocol transceiver for alternating periods of time when the second wireless protocol transceiver is operating in the scan operating mode, and providing a phase shift in the alternating periods of time after a phase interval corresponding to a broadcast transmission interval.

22. A wireless communication device comprising:

a first wireless protocol transceiver to use a first wireless protocol;

a second wireless protocol transceiver to use a second wireless protocol; and means for selectively awarding priority for being enabled between the first wireless protocol transceiver and the second wireless protocol transceiver based at least in part on an operating mode of the second wireless protocol transceiver, wherein the second wireless protocol is a low power wireless protocol including a broadcast operating mode comprising aperiodic time slot for transmission, a burst operating mode comprising an extended broadcast time slot, and a scan operating mode and wherein relatively greater priority is awarded to the broadcast operating mode relative to the burst operating mode and relatively greater priority is awarded to the broadcast operating mode relative to the scan operating mode.

23. The wireless communications device of claim 22, wherein the means for selectively awarding priority to award priority to the second wireless protocol transceiver if the second wireless protocol transceiver is operating in the broadcast operating mode.

24. The wireless communications device of claim 22, wherein the means for selectively awarding priority to award priority to the second wireless protocol transceiver for a first period of time if:

the second wireless protocol transceiver is operating in the burst operating mode, and the means for selectively awarding priority determines a duration of an extended broadcast timeslot corresponding to the burst operating mode is below a threshold, wherein the first period of time corresponds to the duration of the extended broadcast timeslot.

25. The wireless communications device of claim 22, wherein the means for selectively awarding priority to:

award priority to the first wireless protocol transceiver for a first period of time if:

the second wireless protocol transceiver is operating in the burst operating mode, and the means for selectively awarding priority determines a duration of an extended broadcast timeslot corresponding to the burst operating mode is above a threshold; and award priority to the second wireless protocol transceiver for a second period of time, wherein the first period of time precedes the second period of time and the second period of time corresponds to the duration of the extended broadcast timeslot.

26. The wireless communications device of claim 25, wherein the first wireless protocol transceiver to enter a power save mode of operation during the first period of time.

27. The wireless communications device of claim 22, wherein the means for selectively awarding priority is configured to award priority between the first wireless protocol transceiver and the second wireless protocol transceiver for alternating periods of time, wherein each period of time of the alternating periods of time having one of a first duration and a second duration, if the second wireless protocol transceiver is operating in the scan operating mode, such that the means for selectively awarding priority awards priority to the second wireless protocol transceiver for each period of time of the alternating periods of time having the first duration, wherein the first duration corresponds to a broadcast transmission interval.

28. The wireless communications device of claim 22, wherein the means for selectively awarding priority to award priority between the first wireless protocol transceiver and the second wireless protocol transceiver for alternating periods of time when the second wireless protocol transceiver is operating in the scan operating mode, such that the means for selectively awarding priority further to provide a phase shift in the alternating periods of time after a phase interval corresponding to a broadcast transmission interval.

* * * * *